United States Patent
Sakamoto et al.

(10) Patent No.: US 9,645,907 B2
(45) Date of Patent: May 9, 2017

(54) I/O MODULE AND PROCESS CONTROL SYSTEM

(71) Applicant: Yokogawa Electric Corporation, Musashino-shi, Tokyo (JP)

(72) Inventors: Kazushi Sakamoto, Tokyo (JP); Ikutomo Watanabe, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/550,430

(22) Filed: Nov. 21, 2014

(65) Prior Publication Data
US 2015/0149662 A1 May 28, 2015

(30) Foreign Application Priority Data

Nov. 26, 2013 (JP) .................................. 2013-243536

(51) Int. Cl.
| | | |
|---|---|---|
| G06F 3/00 | (2006.01) | |
| G06F 11/30 | (2006.01) | |
| G05B 19/042 | (2006.01) | |
| G06F 13/10 | (2006.01) | |

(52) U.S. Cl.
CPC ...... *G06F 11/3086* (2013.01); *G05B 19/0423* (2013.01); *G06F 13/102* (2013.01)

(58) Field of Classification Search
None
See application file for complete search history.

(56) References Cited

U.S. PATENT DOCUMENTS

| | | | | |
|---|---|---|---|---|
| 6,499,114 B1* | 12/2002 | Almstead | ........... | G05B 19/4184 |
| | | | | 399/26 |
| 2006/0278827 A1* | 12/2006 | Sierra | ....................... | G01J 1/04 |
| | | | | 250/338.1 |
| 2007/0043539 A1* | 2/2007 | Niina | ................. | G05B 23/0245 |
| | | | | 702/188 |

(Continued)

FOREIGN PATENT DOCUMENTS

| | | |
|---|---|---|
| EP | 2 398 190 A1 | 12/2011 |
| JP | 04003206 A | 1/1992 |

(Continued)

OTHER PUBLICATIONS

Anonymous, Gateway (telecommunications), Wikipedia, the free encyclopedia, Jul. 24, 2013. Cited in Office Action dated Jul. 13, 2016, issued in counterpart European Patent Application No. 14194465.2. (3 pages).

*Primary Examiner* — Elias Mamo
(74) *Attorney, Agent, or Firm* — Westerman, Hattori, Daniels & Adrian, LLP (57) ABSTRACT

An I/O module according to one embodiment of the present invention includes a receiver electrically connectable to a field device and configured to receive first information autonomously transmitted from the field device, a storage storing the first information received by the receiver, and a comparator configured to compare the first information stored in the storage and second information newly received by the receiver and to rewrite the first information stored in the storage with the second information newly received by the receiver when the first information stored in the storage is different from the second information newly received by the receiver.

6 Claims, 5 Drawing Sheets

(56) References Cited

U.S. PATENT DOCUMENTS

| | | | |
|---|---|---|---|
| 2008/0082180 A1* | 4/2008 | Blevins | G05B 11/42 700/29 |
| 2008/0155527 A1* | 6/2008 | Lantz | G06Q 40/04 717/171 |
| 2013/0185004 A1 | 7/2013 | Faist | |

FOREIGN PATENT DOCUMENTS

| JP | 2001339421 A | 12/2001 |
|---|---|---|
| JP | 3641137 B2 | 4/2005 |
| JP | 2006146631 A | 6/2006 |
| JP | 2008198148 A | 8/2008 |
| JP | 2013-073503 A | 4/2013 |
| JP | 2013-152612 A | 8/2013 |

* cited by examiner

I/O MODULE AND PROCESS CONTROL SYSTEM

BACKGROUND OF THE INVENTION

Field of the Invention

The present invention relates to an I/O module and a process control system.

Priority is claimed on Japanese Patent Application No. 2013-243536, filed Nov. 26, 2013, the contents of which are incorporated herein by reference.

Description of Related Art

A process control system constructed in a plant or a factory or the like generally has a constitution in which on-site devices called field devices (measuring devices, and actuators), a controller for controlling the operations of field devices, and a host device for managing and controlling the field devices and the controller are connected one another via a communication means. In such process control system, the controller collects process values obtained by the field devices (for example, measured values such as pressure, temperature, and flow rate), and controls the field devices depending on the collected process values under the control of host device.

It is often the case that the process control system includes an operation monitoring terminal to be operated by an operator in a plant or the like and a device management apparatus for determining the normality of process control system. Specifically, the operation monitoring terminal is for conveying the behavior of elements (the field device and the controller), which constitute the process control system, to the operator, and is for controlling the controller based on the instructions from the operator. The device management apparatus is for collecting information indicating the status of each element, which constitutes the process control system, and their setting information to determine the normality of each element, and is for, if needed, conveying the information indicating the normality to an operator or a maintenance worker.

Each of Japanese Patent No. 3641137, Japanese Laid-open Patent Publication No. 2013-73503, and Japanese Laid-open Patent Publication No. 2013-152612 discloses an example of a monitoring control system for monitoring and controlling various plants. Specifically, Japanese Patent No. 3641137 discloses an example of distributed control system, which includes a plurality of local controllers and is for independently controlling each local controller. Japanese Laid-open Patent Publication No. 2013-73503 discloses an example of distributed monitoring control device capable of separating a programming of control logic in each control device and an engineering of process input and output. Japanese Laid-open Patent Publication No. 2013-152612 discloses an example of plant monitoring control system capable of easily changing monitoring images of monitoring device depending on the operation patterns.

The communication performed in the process control system is roughly divided into a communication for controlling the process (hereinafter, referred to as a process control communication) and a communication for determining the normality of process control system (hereinafter, referred to as a normality-determination-communication). The process control communication is performed at a constant frequency between the controller and the field device. Since it is necessary to control process values in real time, the priority of process control communication is set to be higher than that of the normality-determination-communication. On the other hand, the normality-determination-communication is performed in a polling method between the device management apparatus and the field device via the controller. The priority of normality understanding communication is set to be lower than that of the process control communication not to affect the process control communication.

The communication interval of normality-determination-communication is required to be wider than that of the process control communication not to affect the process control. Therefore, there are some cases where it takes a long time to collect data required for the determination of the normality of process control system using the device control apparatus. For example, if the number of elements, which constitute the process control system, becomes approximately several thousands to several tens of thousands, there are some cases where it takes more than an hour to communicate with all of these elements in a polling method. Thereby, when some abnormalities or changes of the elements, which constitute the process control system, are occurred, there are some cases where the recognition of the abnormalities or changes by the device management apparatus is significantly delayed.

The normality-determination-communication in the polling method is performed regardless of whether the abnormalities or changes of the elements occur, which constitute the process control system. Therefore, there are some cases where the communication is performed despite the absence of the abnormalities or changes, thereby the communication affects the communication system. For example, in the large-sized process control system in which a number of field devices are installed, there are some cases where the communication capacity becomes tight due to the occurrence of unnecessary communication.

In recent years, a field device has had intelligent functions, and it is often the case that the field device has, for example, a self-diagnosis function for diagnosing its own status. The field device, which has such functions, is capable of autonomously notifying a host device of the self-diagnosis results and the information indicating the abnormalities and changes which have occurred in the field device. However, such autonomous notification causes an interruption at a non-constant frequency for the controller. Therefore, there are some cases where the notification increases the load of controller and affects the process control communication.

SUMMARY OF THE INVENTION

One aspect of the present invention provides an I/O module and a process control system capable of acquiring information required for the determination of the normality in a short amount of time without increasing the communication load and the processing load.

An I/O module according to one embodiment of the present invention may include a receiver electrically connectable to a field device and configured to receive first information autonomously transmitted from the field device, a storage storing the first information received by the receiver, and a comparator configured to compare the first information stored in the storage and second information newly received by the receiver and to rewrite the first information stored in the storage with the second information newly received by the receiver when the first information stored in the storage is different from the second information newly received by the receiver.

The I/O module described above may further include a comparative result storage storing a comparative result from the comparator, the comparative result indicating whether the first information stored in the storage is different from the second information newly received by the receiver.

The I/O module described above may further include a comparative result notifier configured to perform an external notification when the comparative result from the comparator indicates that the first information stored in the storage is different from the second information newly received by the receiver.

The I/O module described above may further include a collector configured to transmit a request to transmit information to the field device having no function to autonomously transmit information and to collect third information transmitted from the field device as the response for the request to transmit information. The comparator may be configured to compare the third information collected by the collector and information stored in the storage.

In the I/O module described above, the first information autonomously transmitted from the field device may include at least one of information indicating a self-diagnosis result of the field device and information indicating abnormality occurred in the field device.

In the I/O module described above, the comparator may be configured to compare a signal output from the field device having no self-diagnosis function and a reference value previously defined. The comparative result notifier may be configured to perform the external notification indicating an occurrence of abnormality in accordance with the comparative result of the signal and the reference value.

In the I/O module described above, the signal may indicate a process value measured by the field device.

In the I/O module described above, the first information autonomously transmitted from the field device may include fourth information. The comparative result from the comparator for the fourth information may indicate that the fourth information is different from the first information stored in the storage. The I/O module described above may further include a communicator configured to perform an external output of only the fourth information.

A process control system according to one embodiment of the present invention may include an I/O module electrically connectable to a field device and a device management apparatus. The I/O module may include a receiver configured to receive first information autonomously transmitted from the field device, a storage storing the first information received by the receiver, a comparator configured to compare the first information stored in the storage and second information newly received by the receiver and to rewrite the first information stored in the storage with the second information newly received by the receiver when the first information stored in the storage is different from the second information newly received by the receiver, and a comparative result storage storing a comparative result from the comparator. The comparative result may indicate whether the first information stored in the storage is different from the second information newly received by the receiver. The device management apparatus may be configured to acquire the first information stored in the storage from the I/O module in accordance with the comparative result from the comparator stored in the comparative result storage.

In the process control system described above, the I/O module may further include a comparative result notifier configured to perform a notification to the device management apparatus when the comparative result from the comparator indicates that the first information stored in the storage is different from the second information newly received by the receiver. The device management apparatus may be configured to acquire the first information stored in the storage from the I/O module when the device management apparatus receives the notification from the comparative result notifier.

In the process control system described above, the I/O module may further include a collector configured to transmit a request to transmit information to the field device having no function to autonomously transmit information and to collect third information transmitted from the field device as the response for the request to transmit information. The comparator may be configured to compare the third information collected by the collector and information stored in the storage.

In the process control system described above, the first information autonomously transmitted from the field device may include at least one of information indicating a self-diagnosis result of the field device and information indicating abnormality occurred in the field device.

In the process control system described above, the comparator may be configured to compare a signal output from the field device having no self-diagnosis function and a reference value previously defined. The comparative result notifier may be configured to notify the device management apparatus of an occurrence of abnormality in accordance with the comparative result of the signal and the reference value.

In the process control system described above, the signal may indicate a process value measured by the field device.

In the process control system described above, the first information autonomously transmitted from the field device may include fourth information. The comparative result from the comparator for the fourth information may indicate that the fourth information is different from the first information stored in the storage. The I/O module may further include a communicator configured to output only the fourth information to the device management apparatus.

According to one aspect of the present invention, the comparator is configured to compare the information autonomously transmitted from the field device to the I/O module and received by the receiver to the information stored in the storage. When the comparative result from the comparator indicates that the information newly received by the receiver is different from the information stored in the storage, the information stored in the storage is rewritten with the information newly received by the receiver. Therefore, it is unnecessary to perform polling for all field devices as in the related art. The one aspect of the present invention allows for the acquisition of information required for the determination of the normality in a short amount of time without increasing the communication load or the processing load.

DETAILED DESCRIPTION OF THE INVENTION

Hereinafter, I/O modules and process control systems according to several embodiments of the present invention will be described in detail, with references made to the drawings.

First Embodiment

Figure 1:
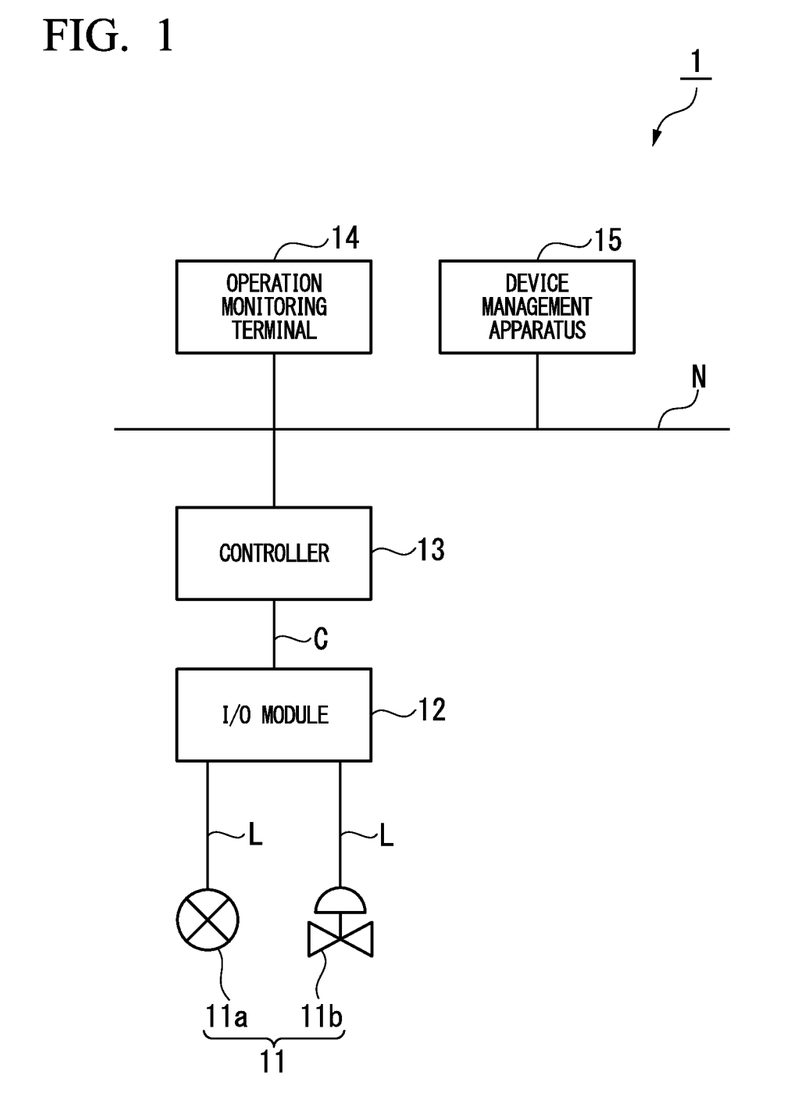
FIG. 1 is a block diagram showing the overall constitution of a process control system according to a first embodiment of the present invention.

FIG. 1 is a block diagram showing the overall constitution of a process control system according to a first embodiment of the present invention. As shown in FIG. 1, a process control system 1 according to the first embodiment includes a field device 11, an I/O module 12, a controller 13, an operation monitoring terminal 14, and a device management apparatus 15. In the process control system 1, the controller 13 controls the field device 11 based on instructions from the operation monitoring terminal 14 or the like, thereby an industrial process implemented in a plant (not shown) is controlled. In the process control system 1 according to the first embodiment, the device management apparatus 15 is capable of determining the normality of process control system 1.

The field device 11 and the I/O module 12 are connected to each other via a transmission line L (for example, a transmission line used for a transmission of signal of "4 to 20 mA"). The I/O module 12 and the controller 13 are connected to each other via a cable C. The controller 13, the operation monitoring terminal 14, and device management apparatus 15 are connected to a control network N. The control network N is for connecting, for example, on-site of a plant and a monitoring room.

The field device 11 includes a sensor device such as a flow gauge or temperature sensor, a valve device such as a flow rate control valve or open and close value, an actuator device such as a fan or motor, and other devices installed on site of a plant. In the first embodiment, in order to facilitate understanding of the following description, a description will be provided for the case in which a state quantity in an industrial process to be controlled is a flow rate of fluid. Therefore, in FIG. 1, one sensor device 11a for measuring a flow rate of fluid and one valve device 11b for controlling (operating) the flow rate of fluid among a plurality of field devices 11 installed in a plant are shown.

The field device 11 includes a self-diagnosis function for diagnosing its own status. The field device 11 autonomously transmits information indicating the diagnosis results by the self-diagnosis function (status information: first information) and information indicating abnormalities occurred in the field device 11 (alarm information: second information) to a host device (I/O module). Both the status information and alarm information relate to the diagnosis results, which are obtained by the self-diagnosis function. In details, the status information includes information indicating the current status of the field device 11. On the other hand, the alarm information includes information used when the field device 11 actively notifies the host device of the change in its own status. The status information may include various kinds of information indicating the current status of the field device 11. Alternatively, the status information may include the summary of various kinds of information indicating the current status of the field device 11. On the other hand, the alarm information includes information indicating the occurrence of change in status. The alarm information is in a different form than that of the status information. The alarm information may include the status information. Alternatively, the alarm information may include the summary of change in status, which indicates what kind of change has been detected. The host device may acquire the status information in a command response method. Alternatively, when the field device 11 periodically transmits the status information to the host device regardless of whether the change in its own status occurs, the host device may acquire the status information by receiving the status information periodically transmitted from the field device 11. On the other hand, the alarm information is autonomously transmitted from the field device 11 when the field device 11 detects the change in its own status. The host device may acquire the alarm information by receiving the alarm information autonomously transmitted from the field device 11. The field device 11 is capable of performing a hybrid communication such as HART (registered trademark). In the HART (registered trademark), the status information corresponds to information obtained as response data of Command #48. The host device may acquire the information in a command response method. When a HART device is in a burst mode, the HART device may autonomously transmit the information to the host device. The host device may acquire the status information by receiving the information autonomously transmitted from the HART device. On the other hand, the alarm information corresponds to information obtained as response data of Command #119. The Command #119 is autonomously transmitted from the HART device when an "Event Notification" setting of the HART device is valid and the status of HART device changes. The HART device repeatedly transmits the response data of Command #119 until the HART device is subjected to an ACK operation of the host device in a command response method. The hybrid communication indicates a communication method capable of simultaneously communicating an analog signal and a digital signal by superimposing the digital signal on the analog signal. For example, the sensor device 11a transmits measured process values as analog signals, and transmits the status information and alarm information as digital signals.

The I/O module 12 is provided between the field device 11 and the controller 13. The I/O module 12 is one, to which a plurality of field devices 11 is connectable. The I/O module 12 processes signals input and output between the connected field device 11 and the controller 13. For example, the I/O module 12 converts signals obtained from the field device 11 (an analog signal such as "4 to 20 mA" and a digital signal superimposed on an analog signal) into signals, which are receivable by the controller 13. It may be said that the I/O module 12 is for connecting the plurality of field devices 11 to the controller 13 and is for relaying signals output from the field devices 11 to the controller 13 and signals output from the controller 13 to the field devices 11. The details of the I/O module 12 will be described later.

The controller 13 performs process control communication with the field device 11 based on the instructions from the operation monitoring terminal 14 to control the field device 11. Specifically, the controller 13 acquires process values measured by one field device 11 (for example, sensor device 11a), and calculates and transmits manipulative variables of another field device (for example, valve device 11b). Thereby, the controller 13 controls another field device 11 (for example, valve device 11b).

The operation monitoring terminal 14 is operated by, for example, an operator in a plant and is used for the monitoring of the process. Specifically, the operation monitoring terminal 14 acquires the input and output data of the field device 11 from the controller 13, notifies an operator of the behavior of the field device 11 and the controller 13, which constitute the process control system 1, and controls the controller 13 based on the instructions from the operator.

The device management apparatus 15 acquires the status information and alarm information of the field device 11 and the controller 13, which constitute the process control system 1, determines the normality of the field device 11 and the controller 13, and notifies an operator and a maintenance worker of the information indicating the normality as needed. When the device management apparatus 15 acquires the status information and alarm information of the field device 11, basically, the device management apparatus 15 does not directly communicate with the field device 11 and acquires the status information and alarm information stored in the I/O module 12 in a command response method. This enables the device management apparatus 15 to acquire the status information and alarm information of the field device 11 in a short amount of time without increasing the communication load of control network N and the processing load of the controller 13.

Figure 2:
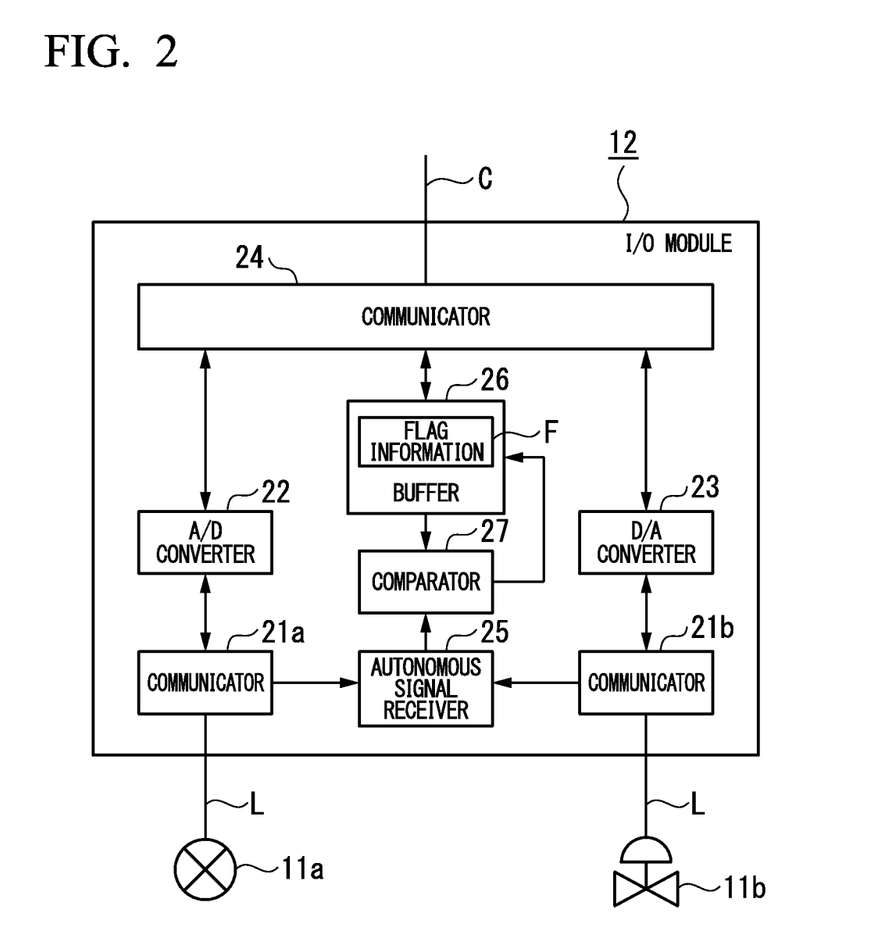
FIG. 2 is a block diagram showing the main parts of the constitution of an I/O module according to the first embodiment of the present invention.

FIG. 2 is a block diagram showing the main parts of the constitution of an I/O module according to the first embodiment of the present invention. As shown in FIG. 2, an I/O module 12 includes a communicator 21a and 21b, an analog-to-digital converter (A/D converter) 22, a digital-to-analog converter (D/A converter) 23, a communicator 24, an autonomous signal receiver 25 (receiver), a buffer 26 (storage, comparison result storage), and a comparator 27. The constitution shown in FIG. 2 is simplified, but the communicator 21a and 21b, the A/D converter 22, and the D/A converter 23 are provided depending on the field device 11, which is connected to them.

The communicator 21a is connected to the sensor device 11a. The communicator 21b is connected to the valve device 11b. The communicators 21a and 21b perform communication in compliance with a communication standard such as HART (registered trademark) with the sensor device 11a and the valve device 11b, respectively. The A/D converter 22 is provided between the communicator 21a and the communicator 24. The A/D converter 22 converts signals (analog signals) received by the communicator 21a into digital signals, and output the digital signals to the communicator 24. The D/A converter 23 is provided between the communicator 21b and the communicator 24. The D/A converter 23 converts signals (digital signals) from the communicator 24 into analog signals, and output the analog signals to the communicator 21b. The communicator 24 is connected to the controller 13 via the cable C, and communicates with the controller 13. The A/D converter 22, the D/A converter 23, and the buffer 26 are connected to the communicator 24 in the I/O module 12. Hereinafter, an output from the communicator 24 to an apparatus other than the I/O module 12 is referred to as an "external output".

The autonomous signal receiver 25 receives information (for example, status information and alarm information) included in signals autonomously transmitted from the sensor device 11a and the valve device 11b. The autonomous signals are included in signals received by each of the communicator 21a and the communicator 21b. The buffer 26 includes, for example, a volatile or non-volatile memory, and individually stores the status information, the alarm information, and the like autonomously transmitted from the sensor device 11a and the valve device 11b. The buffer 26 stores flag information F, which indicates the comparative results obtained from the comparator 27. The flag information F individually indicates whether the status information, the alarm information, and the like change or not, which are autonomously transmitted from the sensor device 11a and the valve device 11b.

The comparator 27 compares information included in the signals received by the autonomous signal receiver 25 (status information, alarm information, and the like) and information stored in the buffer 26 (status information, alarm information, and the like). When a difference occurs in the comparative results, in other words, when the information included in the signals received by the autonomous signal receiver 25 is different from the information stored in the buffer 26, the comparator 27 rewrites the information stored in the buffer 26 with the information newly received by the autonomous signal receiver 25, and stores the comparative results as flag information F into the buffer 26. For example, when the status information obtained from the sensor device 11a changes, the comparator 27 rewrites status information of sensor device 11a stored in the buffer 26 with status information newly received by the autonomous signal receiver 25, and sets a value of flag information F for the sensor device 11a to be "1", which indicates that the status information or the like of the sensor device 11a changes. On the other hand, when the status information obtained from the sensor device 11a remains unchanged, the comparator 27 does not rewrite status information of sensor device 11a stored in the buffer 26, and sets a value of flag information F for the sensor device 11a to be "0", which indicates that the status information or the like of the sensor device 11a remains unchanged.

Next, the operations of process control system having the above-described constitution will be described. In a normal operation, the process control communication between the controller 13 and the field device 11 are performed at a constant frequency to periodically control the field 11. Specifically, first, the controller 13 transmits a command, which indicates a request to transmit process values, to the sensor device 11a, thereby an operation for acquiring the process values measured by the sensor device 11a in a command response method is performed. The process values measured by the sensor device 11a are transmitted to the I/O module 12 as analog signals, the analog signals are converted into digital signals by the A/D converter 22 provided in the I/O module 12, and the digital signals are transmitted to the controller 13.

Next, the controller 13 calculates manipulative variables of the valve device 11b depending on the acquired process values and transmits the calculated manipulative variables to the valve device 11b to control the valve device 11b. The manipulative variables of the valve device 11b calculated by the controller 13 are transmitted to the I/O module 12 as digital signals, the digital signals are converted into analog signals by the D/A converter 23 provided in the I/O module 12, and the analog signals are transmitted to the valve device 11b.

During the above-described operation, the sensor device 11a and the valve device 11b diagnose the self-status by the self-diagnosis function, and autonomously transmit information (status information), which indicates the diagnosis results, to the host I/O module 12. When there are abnormalities in the sensor device 11a and the valve device 11b from any cause, the sensor device 11a and the valve device 11*b* autonomously transmit information (alarm information), which indicates that the abnormalities occur, to the host I/O module 12.

The information autonomously transmitted from the sensor device 11*a* and the information autonomously transmitted from the valve device 11*b* are received by the autonomous signal receiver 25 via the communicator 21*a* and the communicator 21*b*, respectively. Next, the comparator 27 compares the information received by the autonomous signal receiver 25 and the information stored in the buffer 26. When the comparative result from the comparator 27 indicates that the information newly received by the autonomous signal receiver 25 is the same as the information stored in the buffer 26, the information received by the autonomous signal receiver 25 are discarded (a process using the information received by the autonomous signal receiver 25 is not performed).

On the other hand, when the comparative result from the comparator 27 indicates that the information newly received by the autonomous signal receiver 25 is different from the information stored in the buffer 26, the comparator 27 rewrites the information stored in the buffer 26 with the information newly received by the autonomous signal receiver 25. In addition, the comparator 27 stores the comparative results as flag information F into the buffer 26. For example, when the status information of the sensor device 11*a* changes, the comparator 27 rewrites the status information of sensor device 11*a* stored in the buffer 26 with new status information, and sets a value of flag information F for the sensor device 11*a* to be "1". The above-described operations are performed whenever the sensor device 11*a* and the valve device 11*b* autonomously transmit the status information and alarm information.

Independently of the above-described operations, the communication between the device management apparatus 15 and the I/O module 12 is performed at a constant frequency (the frequency longer than that of the process control communication) or a non-constant frequency, and an operation for acquiring information (status information and alarm information) stored in the buffer 26 provided in the I/O module 12 is performed. Specifically, the device management apparatus 15 transmits a command, which indicates a request to acquire status information or the like, to the I/O module 12 via the controller 13, thereby an operation for acquiring the status information or the like stored in the buffer 26 provided in the I/O module 12 in a command response method is performed.

When the device management apparatus 15 transmits the command, which indicates the request to acquire status information or the like, to the I/O module 12, in the I/O module 12, the flag information F stored in the buffer 26 is referred, and only the status information or the like, the value of which is equal to "1", is transmitted to the device management apparatus 15. For example, when the value of flag information F for the sensor device 11*a* is equal to "1" and the value of flag information F for the valve device 11*b* is equal to "0", the status information or the like of the sensor device 11*a* stored in the buffer 26 is transmitted, but the status information or the like of the valve device 11*b* is not transmitted. By acquiring the status information or the like of the field device 11 (sensor device 11*a* and valve device 11*b*), the device management apparatus 15 determines the normality of the field device 11.

As described above, in the first embodiment, the autonomous signal receiver 25 provided in the I/O module 12 receives the information (status information and alarm information) autonomously transmitted from the field device 11, and the comparator 27 compares the received information and the information stored in the buffer 26. When the comparative result indicates that the information newly received by the autonomous signal receiver 25 is different from the information stored in the buffer 26, the information stored in the buffer 26 is rewritten with the information newly received by the autonomous signal receiver 25, and the flag information F, which indicates the comparative results from the comparator 27, is stored.

Thereby, the device management apparatus 15 is capable of acquiring the information required to determine the normality of the process control system 1 by accessing the I/O module 12. Since it is unnecessary to perform polling for all filed devices 11 as in the related art, it is possible to acquire necessary information in a short amount of time. As a result, it is possible to recognize abnormalities and changings occurred in the process control system 1 earlier than in the related art.

In the first embodiment, since the device management apparatus 15 refers the flag information F and acquires only the status information or the like (the content of which changes), the communication load can be reduced. In the first embodiment, the information autonomously transmitted from the field device 11 is received by the I/O module 12, but is not received by the controller 13. Since an interruption at a non-constant frequency does not occur in the controller 13, the processing load of controller 13 can be reduced.

Second Embodiment

Figure 3:
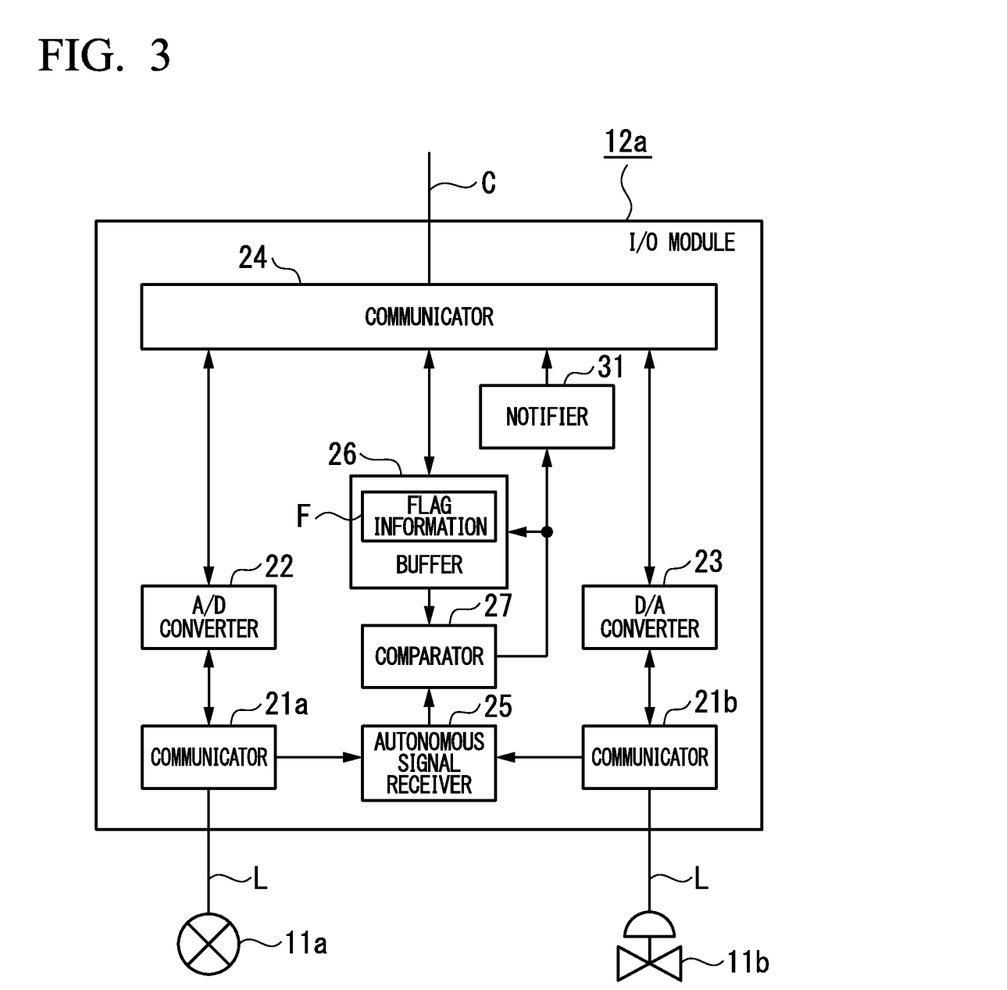
FIG. 3 is a block diagram showing the main parts of the constitution of an I/O module according to a second embodiment of the present invention.

FIG. 3 is a block diagram showing the main parts of the constitution of an I/O module according to a second embodiment of the present invention. In FIG. 3, blocks that correspond to those in FIG. 2 are assigned the same reference numerals. The overall constitution of a process control system according to the second embodiment is similar to that of FIG. 1.

As shown in FIG. 3, an I/O module 12*a* according to the second embodiment has a constitution where a notifier 31 (comparative result notifier) is incorporated into the constitution of the I/O module 12 shown in FIG. 2 (the communicators 21*a* and 21*b*, the A/D converter 22, the D/A converter 23, the communicator 24, the autonomous signal receiver 25, the buffer 26, and the comparator 27). The notifier 31 receives the comparative results from the comparator 27 as inputs. When the comparative result from the comparator 27 indicates that the information newly received by the autonomous signal receiver 25 is different from the information stored in the buffer 26, the notifier 31 notifies the device management apparatus 15 via the communicator 24 and the controller 13 accordingly. Hereinafter, a notification from the notifier 31 to an apparatus other than the I/O module 12 is referred to as an "external notification".

The I/O module 12 according to the first embodiment performs only the rewrite of the information stored in the buffer 26 and the alternation of the flag information F when the comparative result from the comparator 27 indicates that the information newly received by the autonomous signal receiver 25 is different from the information stored in the buffer 26. Therefore, when the device management apparatus 15 acquires the status information or the like stored in the buffer 26 provided in the I/O module 12, it is necessary to communicate with the I/O module 12 at a constant or non-constant frequency.

On the other hand, in the I/O module 12*a* according to the second embodiment, when the changes of status information or the like autonomously transmitted from the field device 11 occur, the occurrence of changes is notified to the device management apparatus 15. Therefore, since the device management apparatus 15 communicates with the I/O module 12*a* only when the device management apparatus 15 receives the notification from the I/O module 12*a*, unnecessary communication can be reduced compared to the first embodiment. When the I/O module 12*a* notifies the device management apparatus 15 of the occurrence of changes, an interruption at a non-constant frequency occurs in the controller 13. Thereby, the processing load of the controller 13 slightly increases compared to the first embodiment. Therefore, the second embodiment is effective for the case that the processing ability of the controller 13 is sufficient and there is a need to determine the normality of the process control system 1 as soon as possible.

Third Embodiment

Figure 4:
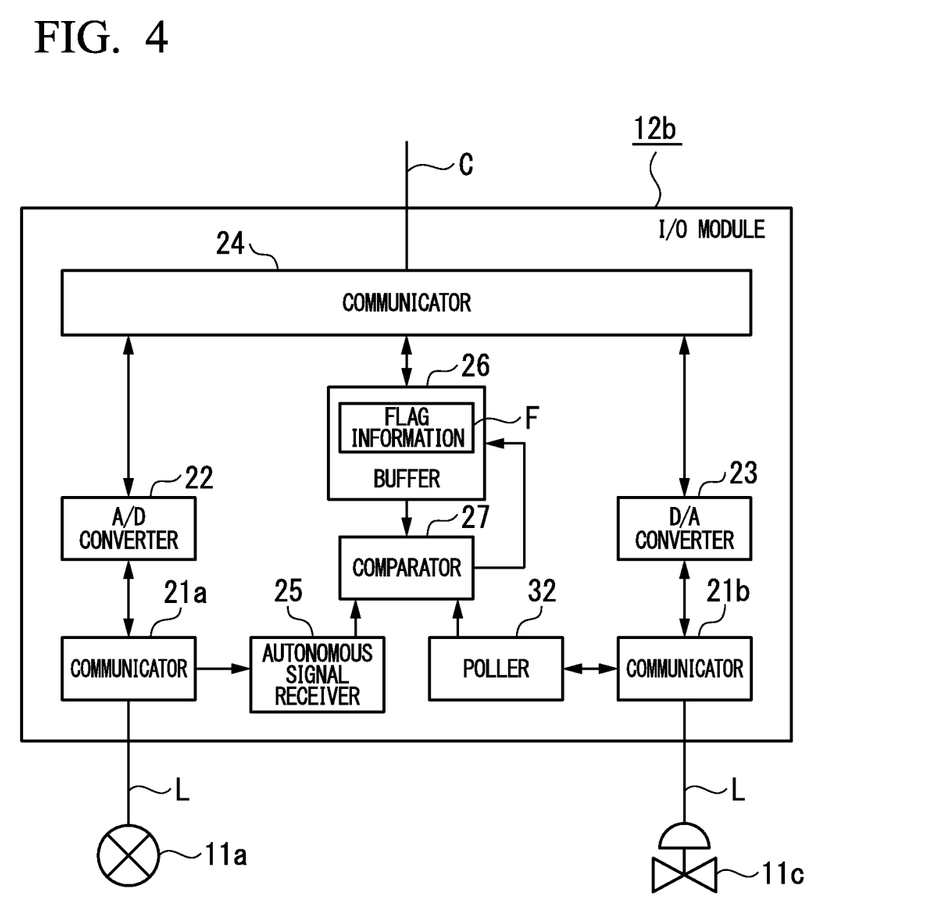
FIG. 4 is a block diagram showing the main parts of the constitution of an I/O module according to a third embodiment of the present invention.

FIG. 4 is a block diagram showing the main parts of the constitution of an I/O module according to a third embodiment of the present invention. In FIG. 4, blocks that correspond to those in FIG. 2 are assigned the same reference numerals. An I/O module 12*b* according to the third embodiment is one, to which a field device 11 (a valve device 11*c* shown in FIG. 4) having no function to perform an autonomous communication is connectable.

As shown in FIG. 4, the I/O module 12*b* according to the third embodiment has a constitution where a poller 32 (collector) is incorporated into the constitution of the I/O module 12 shown in FIG. 2 (the communicators 21*a* and 21*b*, the A/D converter 22, the D/A converter 23, the communicator 24, the autonomous signal receiver 25, the buffer 26, and the comparator 27). Specifically, in the I/O module 12*b*, the autonomous signal receiver 25 is provided between the communicator 21*a* and the comparator 27, and the poller 32 is provided between the communicator 21*b* and the comparator 27. The field device 11*c* having no function to perform an autonomous communication is connected to the communicator 21*b*.

The poller 32 performs a communication with the valve device 11*c* via the communicator 21*b* (for example, a communication at a constant frequency) to acquire status information or the like of the valve device 11*c* in a command response method. In other words, the poller 32 transmits a command, which indicates a request to transmit status information or the like, to the field device 11*c* via the communicator 21*b*, and collects information (status information and alarm information) transmitted from the valve device 11*c* as the response for the command via the communicator 21*b*.

In the constitution shown in FIG. 4, the information (status information or the like) autonomously transmitted from the sensor device 11*a* and received by the autonomous signal receiver 25 provided in the I/O module 12*b* is compared to the information stored in the buffer 26 by the comparator 27. On the other hand, the status information or the like of the sensor device 11*c* is collected by the poller 32 in the command response method, and is compared to the information stored in the buffer 26 by the comparator 27.

As described above, in the third embodiment, the status information or the like of the valve device 11*c*, which has no function to perform an autonomous communication, is collected by the poller 32, and is compared to the information stored in the buffer 26 by the comparator 27. When the comparative result from the comparator 27 indicates that the information newly received by the poller 32 is different from the information stored in the buffer 26, the rewrite of the information stored in the buffer 26 and the alternation of the flag information F are performed as with the case of the first and second embodiments. Therefore, it is possible to acquire much information required to determine the normality of the process control system 1 in a shorter amount of time than in the related art.

Fourth Embodiment

Figure 5:
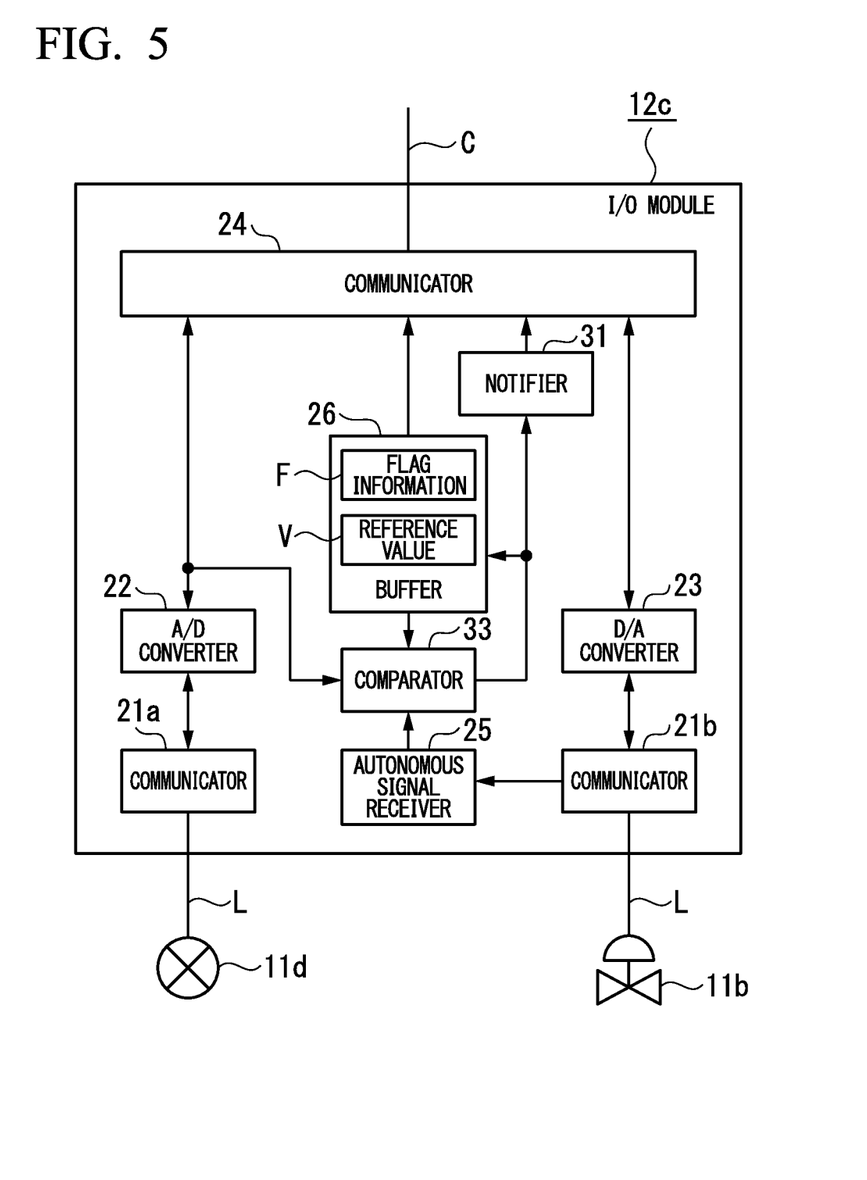
FIG. 5 is a block diagram showing the main parts of the constitution of an I/O module according to a fourth embodiment of the present invention.

FIG. 5 is a block diagram showing the main parts of the constitution of an I/O module according to a fourth embodiment of the present invention. In FIG. 5, blocks that correspond to those in FIG. 3 are assigned the same reference numerals. An I/O module 12*c* according to the fourth embodiment is one, to which a field device 11 (a sensor device 11*d* shown in FIG. 5) having no self-diagnosis function is connectable.

As shown in FIG. 5, the I/O module 12*c* according to the fourth embodiment has a constitution where a comparator 33 is provided instead of the comparator 27 in the I/O module 12*a* shown in FIG. 3 and the comparator 33 detects changings in digital signals output from the A/D converter 22. The autonomous signal receiver 25 is provided between the communicator 21*b* and the comparator 33, and the communicator 21*a* is not connected to the comparator 33. A sensor device 11*d*, which have no self-diagnosis function, is connected to the communicator 21*a*.

As with the case of the comparator 27 shown in FIG. 3, the comparator 33 compares information received by the autonomous signal receiver 25 (status information or the like of the valve device 11*b*) and information stored in the buffer 26 (previous status information or the like of the valve device 11*b*). The comparative 33 is different from the comparator 27 shown in FIG. 3 in that the comparative 33 compares digital signals output from the A/D converter 22 and a reference value V previously stored in the buffer 26. The reference value V is a threshold value for abnormality detection, which is previously defined to detect abnormalities of signals output from the sensor device 11*d*. In other words, when the value of digital signal output from the A/D converter 22 is over the reference value V, the signal output from the sensor device 11*d* is considered as an abnormal signal.

In the above-described constitution, the information (status information or the like) autonomously transmitted from the valve device 11*b* and received by the autonomous signal receiver 25 provided in the I/O module 12*c* is compared to the information (previous status information or the like of the valve device 11*b*) stored in the buffer 26 by the comparator 33. On the other hand, the process value transmitted from the sensor device 11*d* and converted into digital signals by the A/D converter 22 is compared to the reference value V stored in the buffer 26 by the comparator 33. When the comparative result from the comparator 33 indicates that the information newly received by the autonomous signal receiver 25 is different from the information stored in the buffer 26 or that the value of the digital signal output from the A/D converter 22 is over the reference value V, the notifier 31 notifies the device management apparatus 15 via the communicator 24 and the controller 13 of signals indicating that effect.

As described above, in the I/O module 12*c* according to the fourth embodiment, the process value output from the sensor device 11*d*, which has no self-diagnosis function and converted into digital signals is compared to the reference value V stored in the buffer 26. When the comparative result from the comparator 33 indicates that the information newly received by the autonomous signal receiver 25 is different from the information stored in the buffer 26 or that the value of digital signal output from the A/D converter 22 is over the reference value V, that effect is notified to the device management apparatus 15. Therefore, the device management apparatus 15 can acquire information related to the abnormality of the field device 11, which has no self-diagnosis function, in a shorter amount of time than in the related art.

Although the foregoing has been a description of the I/O modules and the process control systems according to several embodiments of the present invention, the present invention is not limited to the embodiments described above, and can be freely modified within the scope of the present invention. For example, in the embodiments described above, the flag information F is stored in the buffer 26. However, the flag information F may be stored in a memory provided separately from the buffer 26. In the embodiments described above, in order to facilitate understanding of the present invention, the example in which one autonomous signal receiver 25, one buffer 26, and one comparator 27 are provided was described. However, the autonomous signal receiver 25, the buffer 26, and the comparator 27 may be provided for each field device 11 (in other words, each channel), which is connected to them.

When a field device 11, which is capable of switching valid and invalid of a function to perform an autonomous communication, is connected to the I/O module, the I/O module may have a function to automatically validate the above-described function of the field device 11 connected to the I/O module. Thereby, it is possible to simplify a setting operation of an operator required to connect the field device to the I/O module.

What is claimed is:

1. A process control system, comprising:
an I/O module electrically connectable to a plurality of first field devices;
a controller configured to communicate with the plurality of first field devices via the I/O module at a constant frequency; and
a device management apparatus configured to acquire information, which the I/O module has obtained from the plurality of first field devices, from the I/O module via the controller and to determine normality of the plurality of first field devices based on the information, wherein the I/O module comprises:
a receiver configured to receive first information autonomously transmitted from each of the plurality of first field devices at a non-constant frequency, the first information includes at least one of a self-diagnosis result and an indication that an abnormality occurred;
a storage storing the first information of each of plurality of the first field devices received by the receiver;
a comparator configured to compare the first information stored in the storage and second information newly received by the receiver for each of the plurality of first field devices to obtain comparative results and to rewrite the first information stored in the storage with the second information newly received by the receiver when the first information stored in the storage is different from the second information newly received by the receiver for each of the plurality of first field devices, the comparative results indicating whether the first information stored in the storage is different from the second information newly received by the receiver for each of the plurality of first field devices; and
a comparative result storage storing the comparative results, and
the device management apparatus is configured to acquire information of the plurality of first field devices from the I/O module via the controller based on the comparative results stored in the comparative result storage.

2. The process control system according to claim 1, wherein the I/O module further comprises a comparative result notifier configured to receive the comparative result for each of the plurality of first field devices from the comparator and to notify the device management apparatus of the comparative result via the controller when the comparative result from the comparator indicates that the first information stored in the storage is different from the second information newly received by the receiver.

3. The process control system according to claim 1, wherein the I/O module further comprises a collector configured to transmit a request to transmit information to a second field device having no function to autonomously transmit information and electrically connected to the I/O module, to receive, from the second field device, third information transmitted from the second field device as the response for the request to transmit information, and to collect the third information, and
wherein the comparator is configured to compare the third information collected by the collector and information stored in the storage.

4. The process control system according to claim 1, wherein the I/O module is configured to compare a signal output from a third field device having no self-diagnosis function and electrically connected to the I/O module and a reference value previously defined and to notify the device management apparatus of an occurrence of abnormality via the controller when the signal is over the reference value.

5. The process control system according to claim 2, wherein the device management apparatus is configured to acquire the first information stored in the storage from the I/O module via the controller when the device management apparatus receives the notification from the comparative result notifier.

6. The process control system according to claim 4, wherein the signal indicates a process value measured by the third field device.

* * * * *